US006350331B1

(12) United States Patent
Kon et al.

(10) Patent No.: US 6,350,331 B1
(45) Date of Patent: Feb. 26, 2002

(54) METHOD FOR LAMINATING WOODY FIBERBOARD

(75) Inventors: Michihiro Kon; Masataka Kon, both of Aomori-ken (JP)

(73) Assignee: Shinseikan Co., Ltd., Morioka (JP)

( * ) Notice: Subject to any disclaimer, the term of this patent is extended or adjusted under 35 U.S.C. 154(b) by 0 days.

(21) Appl. No.: 09/591,157

(22) Filed: Jun. 9, 2000

(30) Foreign Application Priority Data

Jun. 14, 1999 (JP) .......................................... 11-167081

(51) Int. Cl.[7] ................................................ B32B 31/12

(52) U.S. Cl. ................... 156/62.2; 156/250; 156/331.4; 156/331.7; 144/350; 144/355; 427/440

(58) Field of Search ................................ 156/62.2, 250, 156/296, 331.4, 331.7; 144/346, 350, 355; 427/209, 211, 440

(56) References Cited

U.S. PATENT DOCUMENTS 5,554,429 A * 9/1996 Iwata et al. ................. 428/105
6,037,049 A * 3/2000 Tingley ................... 428/299.1

FOREIGN PATENT DOCUMENTS

JP 67009019 B1 * 5/1942

* cited by examiner

*Primary Examiner*—Sam Chuan Yao
(74) *Attorney, Agent, or Firm*—Flynn, Thiel, Boutell & Tanis, P.C.

(57) ABSTRACT

It is to provide a method for laminating a woody fiberboard in which woody fiberboards are laminated with increasing the strength thereof, the laminated woody fiberboard is processed into a prescribed shape and the strength of the processed article is increased, so as to complete the product. The method comprises the steps of: molding wood chips using an adhesive as a binder, to produce a woody fiberboard having a prescribed thickness; impregnating or coating a single board of the woody fiber board with a polyurethane series primer, followed by drying; laminating by adhering two or more of the dried woody fiberboards with adhesive; processing the laminated woody fiberboard by a cutting blade into a prescribed shape; impregnating or coating the processed article with a polyurethane series primer followed by drying; and impregnating or coating the dried article with one or more of a urethane series resin, a melamine series resin, a polyester series resin and a lacquer, so as to finish the product.

18 Claims, 4 Drawing Sheets

METHOD FOR LAMINATING WOODY FIBERBOARD

FIELD OF THE INVENTION

The present invention relates to a method for laminating woody fiberboard for various kinds of usage.

BACKGROUND OF THE INVENTION

A woody fiberboard, a so called MDF board (Medium Density Fiberboard) is produced by molding into a plate form under the heat and pressure, fibers obtained by splitting wood chips into a cotton substance along with an adhesive. The MDF board is used for various materials for construction, furniture, washstands and kitchen units owing to its light weight, high strength and water resistance.

The MDF has remarkably excellent characteristics in that sapling and thinned wood can be utilized as a raw material and therefore, it is a new material attracting world wide attention in a view of the effective utilization of forest resources and the global environmental issues, such as the world wide shortage of forest resources.

Furthermore, the MDF board has the following excellent characteristics; a warp, twisting and cracking which are liable to occur in natural wood, can be prevented. It has feeling that is equivalent to natural wood. It has strength and toughness that are higher by 1.5 to 3 times than natural wood. It is stable against water and moisture. No unevenness is formed on the surface during a long term use.

However, due to the production process thereof comprising pressing under the heat and pressure, there is a difference in material and specific gravity between the surface part and the central part of the article and has a problem, in that the smooth coating surface suffers immediately after coating a slight unevenness, from 3 to 6 months, because of the unevenness in degree of penetration of the coated material.

The MDF board also has a problem, in that swelling, warping and cracking at cutted ends occurs upon absorbing water.

Furthermore, the MDF board cannot be used where a certain strength is required and the thickness thereof is limited to about 40 mm at most, so that it can not be used for an article having a large thickness.

It is also impossible to produce articles having various sizes and shapes, such as an article having a curved surface and an article having a small thickness and a high strength.

SUMMARY OF THE INVENTION

The invention has been developed in order to solve the problems described above. An object of the invention is therefore to provide a method for laminating a woody fiberboard, in that woody fiberboards are laminated with increasing the strength thereof, the laminated woody fiberboard is processed by cutting into a prescribed shape and the strength of the processed article is further increased to finish the product so as to obtain an article having various sizes and shapes.

A laminated body of a woody fiberboard having various sizes and shapes can be obtained by a method for laminating a woody fiberboard comprising the steps of:

molding wood chips using an adhesive as a binder, to produce a woody fiberboard having a prescribed thickness;

impregnating or coating a single board of the woody fiberboard with a polyurethane series primer, followed by drying;

laminating by adhering two or more of the dried woody fiberboards with an aqueous polymeric isocyanate series adhesive;

processing the laminated woody fiberboard by a cutting blade into a prescribed shape;

impregnating or coating the processed article with a polyurethane series primer, followed by drying; and impregnating or coating the dried article with one or more of a urethane series resin, a melamine series resin, a polyester series resin and a lacquer.

PREFERRED EMBODIMENTS OF THE INVENTION

Figure 1:
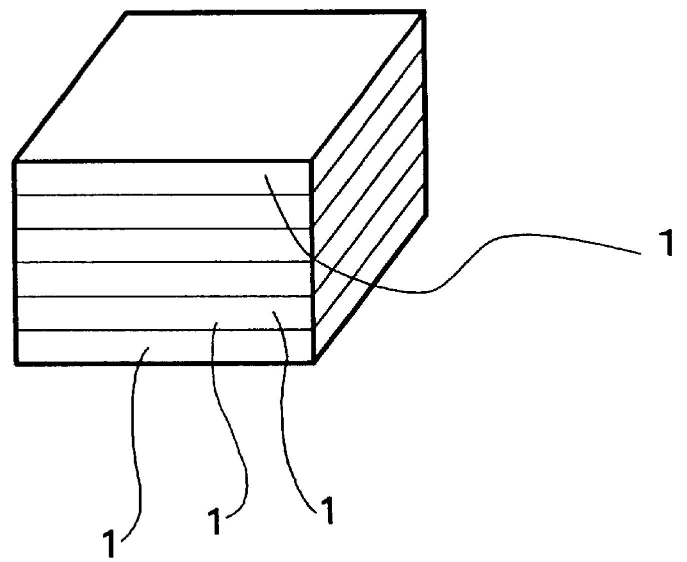
FIG. 1 is a perspective view showing an embodiment where plural woody fiberboards are laminated.

An embodiment of the method for laminating a woody fiberboard according to the invention will be described with reference to examples thereof.

As a material of the woody fiberboard of the invention, a woody fiberboard is used, which is obtained by molding into a plate form under the heat and pressure, fibers obtained by splitting wood chips into a cotton substance, with a urethane series or melamine series adhesive as a binder.

The woody fiberboard is of lightweight of a specific gravity of from 0.40 to 0.70, with an excellent strength in comparison to conventional particleboard and sheathing board and has a various kind of usage. For example, a fiberboard using conifer chips having a thickness of 3 mm has a specific gravity of 0.525, a density of 0.75 $g/cm^3$, a bending strength of 440 $kg/cm^2$, a peeling strength of 10.5 $kg/cm^2$, and water absorption ratio of 47%. While the strength of the board is generally proportional to the specific gravity, the woody fiberboard used in the invention is lighter than the particle board, and has higher strength by 1.5 to 2.0 times and a higher impact strength by 2 to 3 times than those of particle board. Furthermore, the woody fiberboard has a stability against water and moisture, that is equivalent to plywood.

As the woody fiberboard, those having a thickness of about from 2.5 to 40 mm are suitably selected and used.

Both surfaces of the woody fiberboard having a prescribed thickness are impregnated or coated with a polyurethane series primer, to remove warp and distortion inherent in the board and simultaneously increase the strength thereof by 1.5 times or more.

After impregnating or coating the polyurethane series primer, the woody fiberboard is then placed in a drying chamber at a temperature of 25° C. or more and a humidity of 60% or more to dry the woody fiberboard over 8 hours or more.

Examples of dried woody fiberboard that are laminated and adhered in all directions (in plural directions) are shown in FIGS. 1 to 5. An aqueous polymeric isocyanate series adhesive is used as the adhesive for laminating. The number of laminated layers can be appropriately determined by considering the final product.

The adhesive, used for the woody fiberboard will be described in more detail below:

100 units (weight ratio) of a modified vinyl resin as a base agent and 15 units of a polyisocyanate as a hardening agent are stirred and evenly mixed. The mixture can be used until 30 minutes after mixing at the temperature of 25 to 35° C. in the summer season and until 1 hour after mixing at a temperature of 5 to 25° C. in the other seasons.

The strength of the woody fiberboard can be increased by 2 to 3 times according to the procedures described above.

After sufficiently adhering and jointing the woody fiberboards, the laminated woody fiberboard is processed by cutting into a prescribed shape depending on the usage by using processing means. Digging through processing and hollowing out processing can also be conducted.

The cutting process of the woody fiberboard is conducted by using a new ceramics bit tool, an industrial diamond bit tool, a superhard bit tool and a diamond cut chip saw. An automated computer controlled cutting process can be used.

The article obtained by processing the woody fiberboard depending on various kinds of usage is impregnated or coated with a polyurethane series primer, dried and hardened in a drying chamber over 8 hours and more. The drying chamber has a temperature of 25° C. or more and a humidity of 60%.

After drying and hardening the woody fiberboard that has been processed into the prescribed shape, it is impregnated or coated with a urethane series resin, a melamine series resin, a polyester series resin or a lacquer, to produce a laminated solid processed product.

Examples of the mode of laminating the woody fiberboard will be described below.

EXAMPLE 1

In the embodiment shown in FIG. 1, plurality of the woody fiberboards 1 is laminated in the horizontal direction.

EXAMPLE 2

Figure 2:
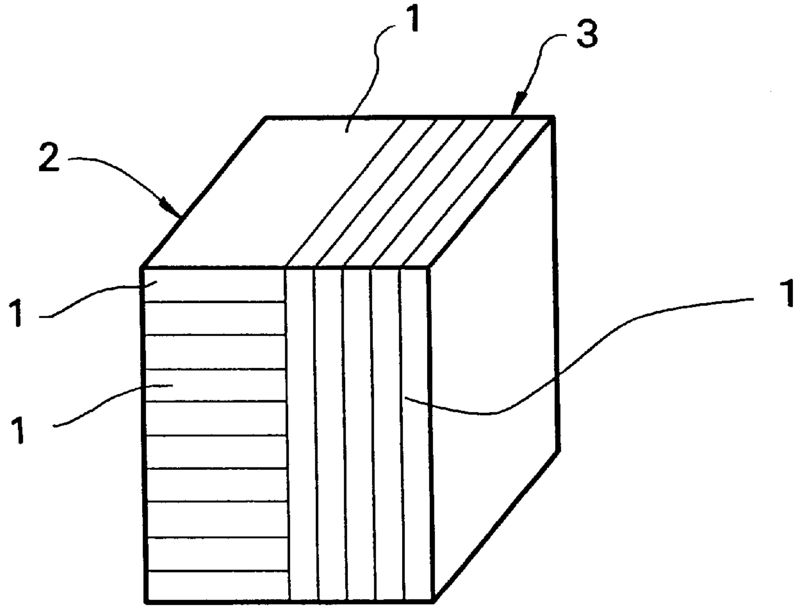
FIG. 2 is a perspective view showing another embodiment where plural woody fiberboards are laminated.

In the embodiment shown in FIG. 2, an article 2 obtained by laminating the woody fiberboards 1 in the horizontal direction and an article 3 obtained by laminating them in the vertical direction are adhered on the side walls thereof.

EXAMPLE 3

Figure 3:
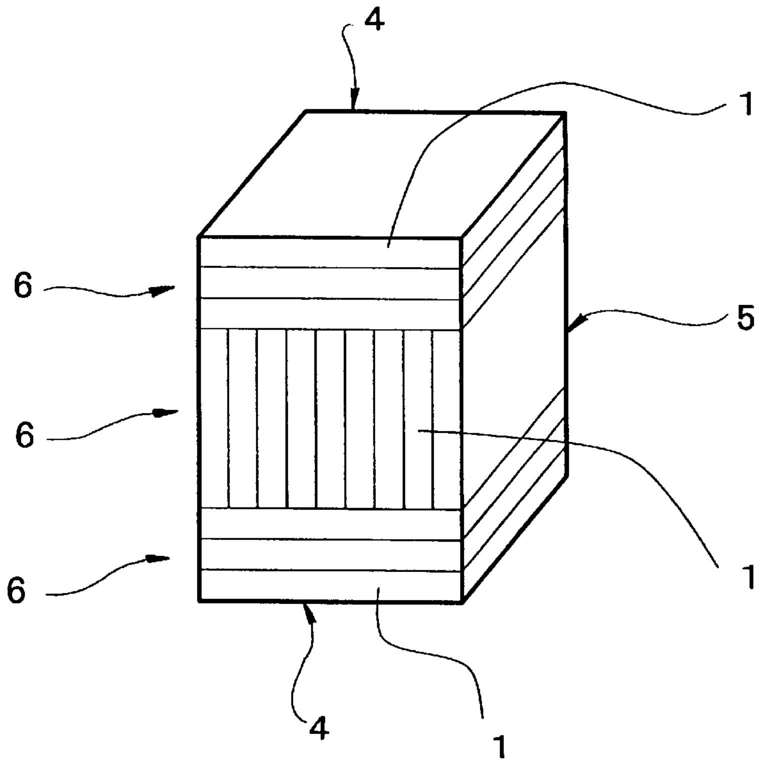
FIG. 3 is a perspective view showing still another embodiment where plural woody fiberboards are laminated.

In the embodiment shown in FIG. 3, plurality of articles 4 obtained by laminating the woody fiberboards 1 in the horizontal direction and an article 5 obtained by laminating them in the vertical direction are adhered into one body in the vertical direction. In this example, three layers 6 are formed.

EXAMPLE 4

Figure 4:
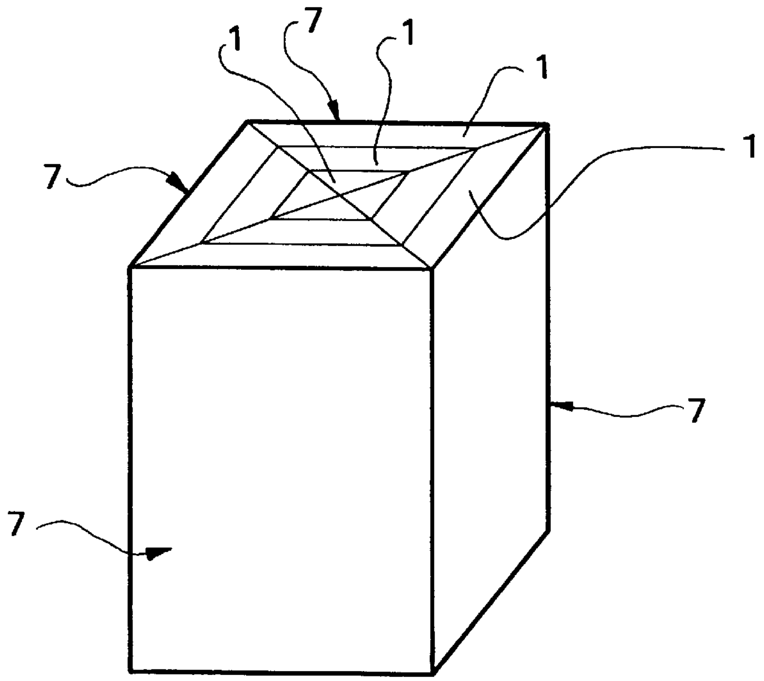
FIG. 4 is a perspective view showing a further embodiment where plural woody fiberboards are laminated.

In the embodiment shown in FIG. 4, plurality of articles 7 obtained by laminating the woody fiberboards 1 in the vertical direction are cutted into a triangular prism shape, and are adhered to each other to form a quadratic prism shape.

EXAMPLE 5

Figure 5:
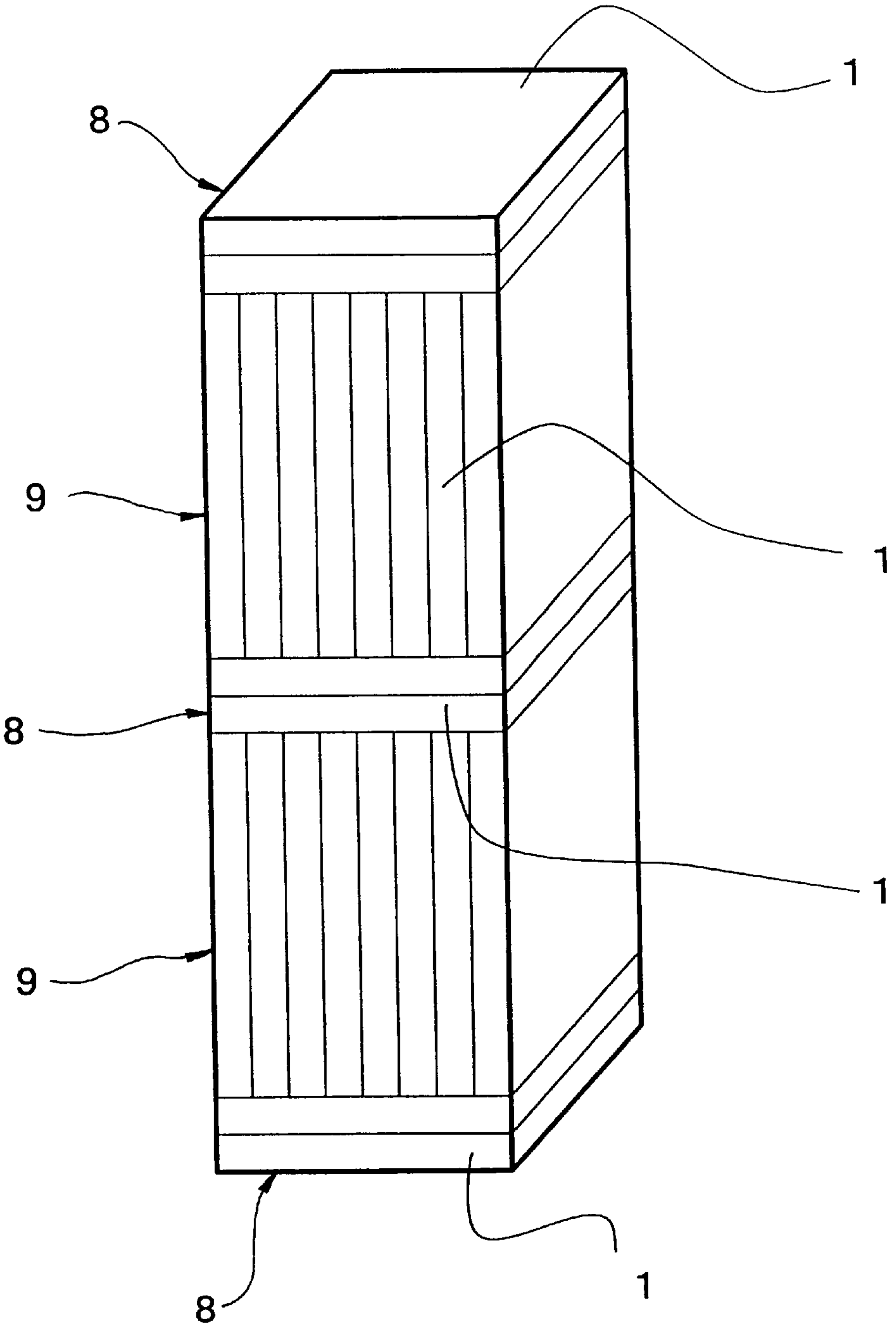
FIG. 5 is a perspective view showing still further embodiment where plural woody fiberboards are laminated.

In the embodiment shown in FIG. 5, plurality of articles 8 obtained by laminating the woody fiberboards 1 in the horizontal direction and plurality of articles 9 obtained by laminating them in the vertical direction are adhered into one body in the vertical direction to form five layers.

Figure 6:
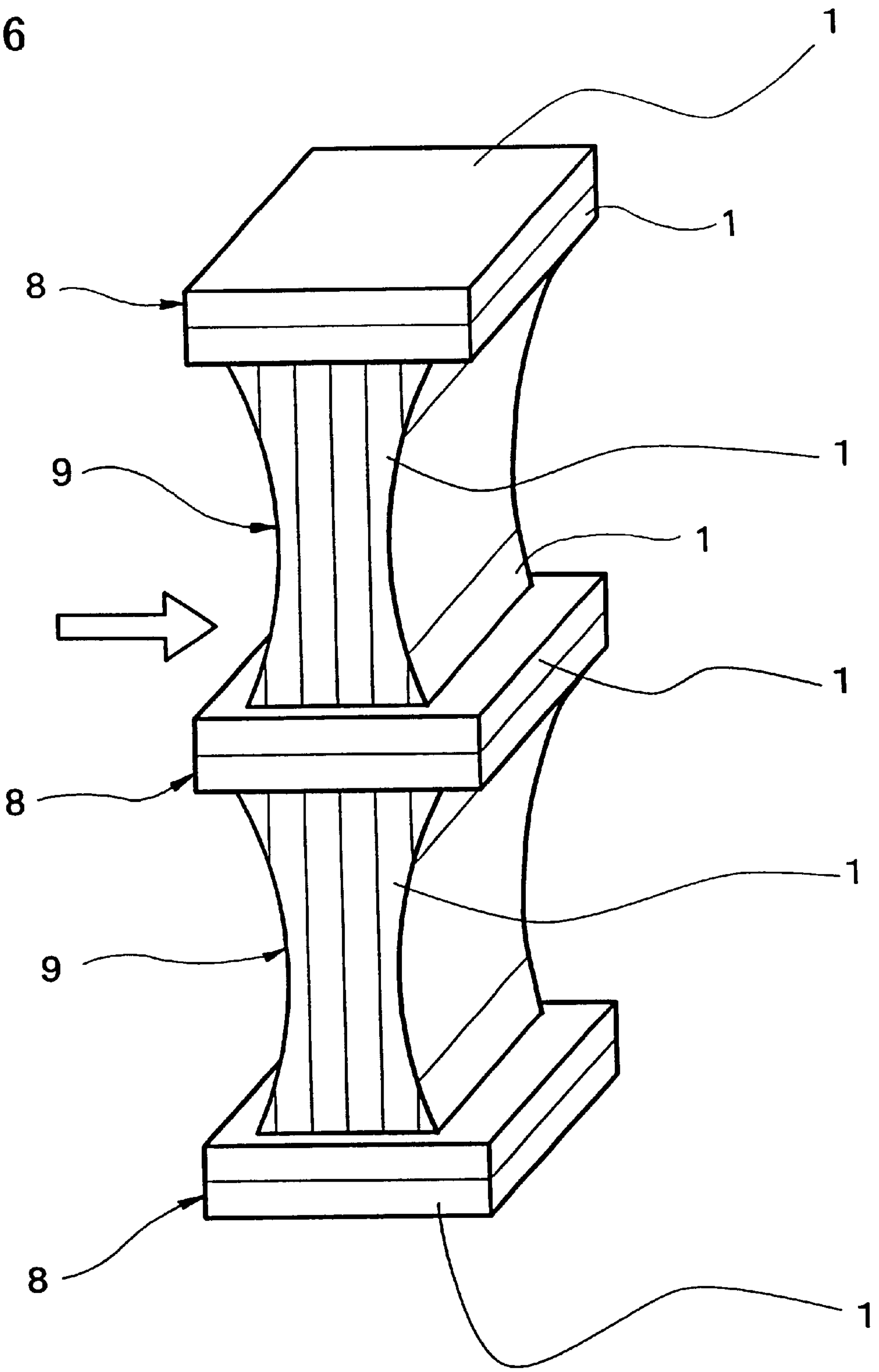
FIG. 6 is a perspective view showing an embodiment where an article obtained by laminating plural woody fiberboards is processed to produce a product.

The laminate obtained by laminating the woody fiberboards 1 to form five layers is processed by cutting into the shape shown in FIG. 6 by a superhard bit tool or a diamond cut chip saw or the like.

In the invention, because the woody fiberboard used as a raw material comprises fibers obtained by splitting wood chips, sapling and thinned wood can be utilized to effectively utilize the forest resources.

In the invention, furthermore, a single board of a woody fiberboard is impregnated or coated with a polyurethane series material to increase the strength of the single board and then the woody fiberboard is laminated by using an isocyanate series adhesive to further increase the strength. The laminated fiberboard is further processed by cutting into a necessary shape. While the laminated fiberboard has certain hardness in this stage, the cutting procedure can be easily conducted to process into various sizes and shapes and thus it is excellent in processing property. Thereafter a further higher hardness (200 kg/cm2) can be obtained by impregnating or coating with urethane series solvent. As a result, a product having an excellent strength in comparison to natural wood can be obtained.

Because the woody fiberboard comprises wood chips containing pores inside, it can be easily impregnated and penetrated with various solvents and the strength thereof can be uniform to completely prevent the formation of cracking, distortion, warp and worm-eaten parts, which frequently occur in natural wood.

Furthermore, because the woody fiberboards are laminated, a pattern like annual rings of a tree can be created in various forms depending on necessity, to obtain the beauty of natural wood. The feeling on touching of the laminated woody fiberboard is the same as that of natural wood.

Accordingly, various solid processed products, such as articles for handicapped persons, interior equipments, furniture and household goods, house related equipments, and construction finishing materials, can be produced. Furthermore, because the laminated woody fiberboard has excellent water resistance, it can be applied to various exterior materials for construction, civil engineering related materials, various exterior materials and interior sanitary and kitchen parts. Moreover, because the laminated woody fiberboard has a high strength, it can also be applied to various structural members for construction and civil engineering construction and structural member of a large cross sectional area.

What is claimed is:

1. A method for laminating a woody fiberboard comprising the steps of:

molding wood chips using an adhesive as a binder to produce a plurality of individual woody fiberboards each having a central portion with a prescribed thickness and an outer surface surrounding said central portion;

impregnating or coating said outer surfaces of single boards of said woody fiberboard with a polyurethane series primer, followed by drying;

laminating by adhering two or more of said dried woody fiberboards with an aqueous polymeric isocyanate series adhesive to form a laminated woody fiberboard;

processing said laminated woody fiberboard with a cutting blade which cuts into and exposes one or more of said central portions to define a processed article, said processed article having an exterior surface which includes said one or more exposed central portions and defines a prescribed shape for said processed article;

impregnating or coating said exterior surface of said processed article with a polyurethane series primer, followed by drying; and impregnating or coating said dried article with one or more of a urethane series resin, a melamine series resin, a polyester series resin and a lacquer.

2. The method according to claim 1, wherein said laminated woody fiberboard includes a first plurality of said dried woody fiberboards that are provided in parallel facing relation.

3. The method according to claim 1, wherein said impregnated or coated woody fiberboards each has a thickness defined by opposite faces wherein said opposite faces are impregnated or coated by said polyurethane series primer.

4. The method according to claim 1, wherein said adhesive of said molding step is either a melamine series adhesive or a urethane series adhesive.

5. A method for laminating a woody fiberboard comprising the steps of:

molding wood chips using an adhesive as a binder to produce a woody fiberboard having a prescribed thickness;

impregnating or coating a single board of said woody fiberboard with a polyurethane series primer, followed by drying;

laminating by adhering two or more of said dried woody fiberboards with an aqueous polymeric isocyanate series adhesive, said laminated woody fiberboard including a first plurality of said dried woody fiberboards that are provided in parallel facing relation, said laminated woody fiberboard including a second plurality of said dried woody fiberboards that are provided in parallel facing relation, said first plurality of said dried woody fiberboards being oriented transverse to said second plurality of said dried woody fiberboards;

processing said laminated woody fiberboard with a cutting blade into a prescribed shape;

impregnating or coating said processed article with a polyurethane series primer, followed by drying; and impregnating or coating said dried article with one or more of a urethane series resin, a melamine series resin, a polyester series resin and a lacquer.

6. The method according to claim 5, wherein said first and second pluralities of said dried woody fiberboards have opposing surfaces adhered together.

7. The method according to claim 5, wherein said first plurality of said dried woody fiberboards are oriented substantially perpendicular to said second plurality.

8. A method for laminating a woody fiberboard comprising the steps of:

providing a plurality of woody fiberboards having a prescribed thickness;

impregnating or coating said woody fiberboards individually with a polyurethane series primer and then drying said woody fiberboards to define strengthened fiberboards;

laminating by adhering a plurality of said strengthened fiberboards together by an aqueous polymeric isocyanate series adhesive to define a fiberboard laminate having a first shape;

shaping said fiberboard laminate to have a prescribed second shape by removing fiberboard material to expose an interior portion of said woody fiberboards;

impregnating or coating said fiberboard laminate with a polyurethane series primer to define a strengthened article which is then dried; and impregnating or coating said strengthened article with one or more of a urethane series resin, a melamine series resin, a polyester series resin and a lacquer.

9. The method according to claim 8, wherein said woody fiberboards are provided by molding wood chips together using an adhesive as a binder.

10. The method according to claim 8, wherein said fiberboard material is removed by a cutting device.

11. Method according to claim 8, wherein said impregnating or coating of said woody fiberboards includes the step of removing distortion of said woody fiberboards by applying said polyurethane series primer to opposing faces of each said woody fiberboard.

12. A method for laminating a woody fiberboard comprising the steps of:

providing a plurality of woody fiberboards having a prescribed thickness;

impregnating or coating said woody fiberboards individually with a polyurethane series primer and then drying said woody fiberboards to define strengthened fiberboards;

laminating by adhering a plurality of said strengthened fiberboards together by an aqueous polymeric isocyanate series adhesive to define a fiberboard laminate wherein said strengthened fiberboards of said fiberboard laminate are oriented in plural directions;

shaping said fiberboard laminate to have a prescribed shape;

impregnating or coating said fiberboard laminate with a polyurethane series primer to define a strengthened article which is then dried; and impregnating or coating said strengthened article with one or more of a urethane series resin, a melamine series resin, a polyester series resin and a lacquer.

13. A method for forming a hardened laminated article, comprising the steps of:

providing a plurality of woody fiberboards each having a shape defined by an outer surface;

strengthening said woody fiberboards by impregnating or coating said outer surfaces of said woody fiberboards with a polyurethane series material to define strengthened fiberboards;

laminating said strengthened fiberboards with an isocyanate series adhesive to define a strengthened fiberboard laminate having a first shape;

processing said fiberboard laminate into a processed article having a prescribed second shape by removing woody fiberboard material from said fiberboard laminate; and impregnating or coating all exposed surfaces of said processed article with a urethane series primer to define a hardened processed article.

14. The method according to claim 13, wherein said woody fiberboards are formed by molded wood chips held together by a binder.

15. The method according to claim 13, wherein said woody fiberboards each have opposing faces, said woody fiberboards being strengthened individually wherein each of said opposing faces is impregnated or coated with said polyurethane series material.

16. The method according to claim 13, wherein said laminating step includes providing a first plurality of said strengthened fiberboards in a first orientation and providing a second plurality of said strengthened fiberboards in a second orientation transverse to said first orientation.

17. The method according to claim 13, further including the step of impregnating or coating said processed article with a final hardening material.

18. The method according to claim 17, wherein said final hardening material is a urethane series resin, a melamine series resin, a polyester series resin or a lacquer.

* * * * *